United States Patent
Bach et al.

(10) Patent No.: US 11,105,663 B2
(45) Date of Patent: Aug. 31, 2021

(54) ASSEMBLY KIT FOR CONSTRUCTION OF A MEASUREMENT DEVICE

(71) Applicant: Testo SE & Co. KGaA, Lenzkirch (DE)

(72) Inventors: Sebastian Bach, Breitnau (DE); Markus Munzer, Hufingen (DE); Stefan Schott, Oberbergen (DE); Katharina Schuler, Freiburg (DE)

(73) Assignee: Testo SE & Co. KGaA, Lenzkirch (DE)

( * ) Notice: Subject to any disclaimer, the term of this patent is extended or adjusted under 35 U.S.C. 154(b) by 174 days.

(21) Appl. No.: 16/339,563

(22) PCT Filed: Oct. 4, 2017

(86) PCT No.: PCT/EP2017/001168
§ 371 (c)(1),
(2) Date: Apr. 4, 2019

(87) PCT Pub. No.: WO2018/072864
PCT Pub. Date: Apr. 26, 2018

(65) Prior Publication Data
US 2020/0041317 A1    Feb. 6, 2020

(30) Foreign Application Priority Data
Oct. 21, 2016   (DE) .......................... 102016012567.5

(51) Int. Cl.
*G01D 21/02*   (2006.01)
*G01D 11/24*   (2006.01)

(52) U.S. Cl.
CPC ........... *G01D 21/02* (2013.01); *G01D 11/245* (2013.01)

(58) Field of Classification Search
CPC ....... G01D 11/245; G01D 21/00; G01D 21/02
See application file for complete search history.

(56) References Cited

U.S. PATENT DOCUMENTS

| 2010/0000316 A1* | 1/2010 | Fehrenbach ......... G01F 23/284 |
| | | 73/295 |
| 2014/0109700 A1 | 4/2014 | Yltchev-Edelmann et al. |

(Continued)

FOREIGN PATENT DOCUMENTS

| CN | 110836681 A | * | 2/2020 |
| CN | 210665096 U | * | 6/2020 |

(Continued)

OTHER PUBLICATIONS

ZF Switches & Sensors: "Cherry's modular sensor kit", youtube, Nov. 6, 2014, 1 pg., www.youtube.com/watch?v+5kg6sJXp09M, video not available as of Apr. 1, 2019.

(Continued)

*Primary Examiner* — Francis C Gray
(74) *Attorney, Agent, or Firm* — Volpe Koenig

(57) ABSTRACT

A measuring apparatus (13) that is able to be put together from an assembly kit, wherein the assembly kit has at least two sensor units (1), which are each fashioned for measuring different variables, and at least two communication units (6), which each have different interfaces for data transmission, and each of the sensor units (1) is detachably connectable to each of the communication units (6) of the assembly kit by a mechanical coupling (7).

18 Claims, 3 Drawing Sheets

(56) References Cited

U.S. PATENT DOCUMENTS

Figures 1A, 1B, 1C, 1D, 1E, 1F, 1G:
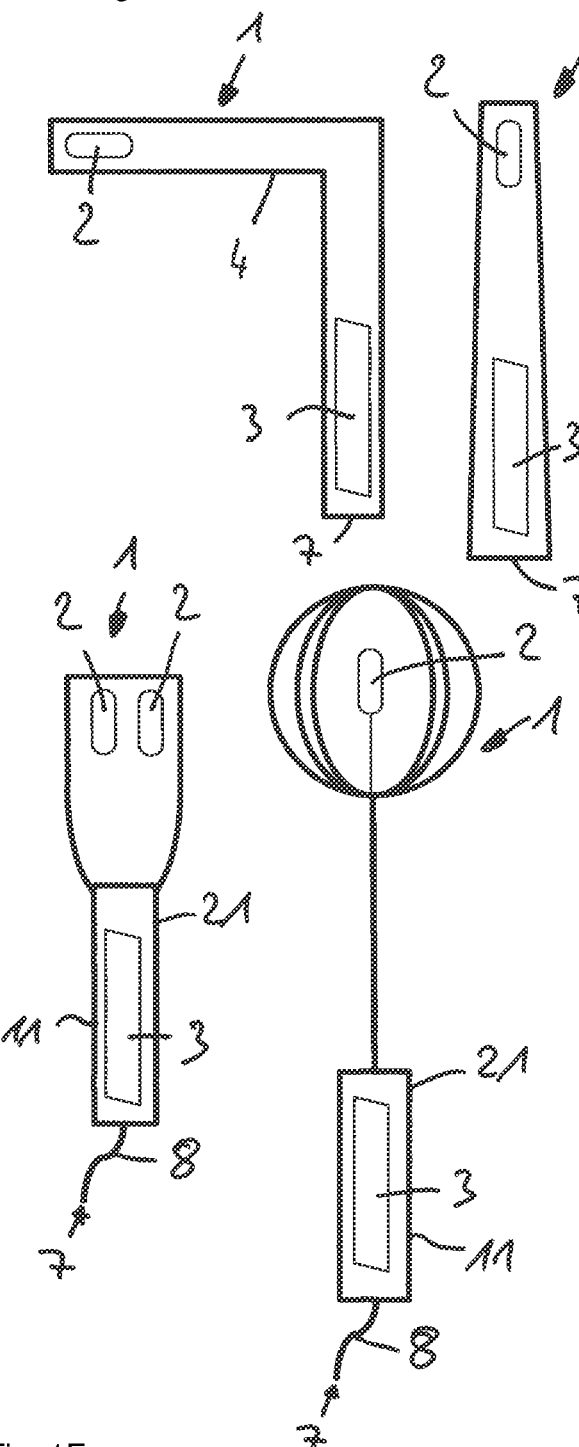

2015/0168185 A1 6/2015 Huang et al.
2019/0376814 A1* 12/2019 Kopke ................. B62K 25/283

FOREIGN PATENT DOCUMENTS

| CN | 211178587 U | * | 8/2020 |
|---|---|---|---|
| CN | 211317375 U | * | 8/2020 |
| DE | 102007053833 | | 5/2009 |
| DE | 102010038734 | | 2/2012 |
| DE | 102011001214 | | 9/2012 |
| EP | 2725326 | | 4/2014 |
| EP | 2908102 | | 8/2015 |
| WO | 2004017025 | | 2/2004 |

OTHER PUBLICATIONS

Network World: "Microduino mCookie; a platform for experimenting with the Internet of Things. Great idea but . . . ", 9 pages, www.networkworld.com/article/3104657/internet-of-things/microduino-mcookie-a-platform-for-experimentnig-with-the-internet-of-things-great-idea-but.html, Aug. 6, 2016.

Testo SE & Co. KGaA: "Anwednungshinweise-Testo Funkfuhler", https://media.testo.com/media/9a/b2/3b6b607496f0/testo-Radio-probes-Application-Information.pdf, 12 pgs, Jun. 2007.

Testo SE & Co. KgaA: "Bedienungsanleitung Profi-Teleskop fur steckbare Flugelradsonden", https://media.testo.com/media/8e/86/a13d18f6dcab/Teselscope-or-plug-in-vane-probes-Application-information.pdf), 1pg, Feb. 2004.

* cited by examiner

Fig. 2A  Fig. 2B  Fig. 2C  Fig. 2D  Fig. 2E
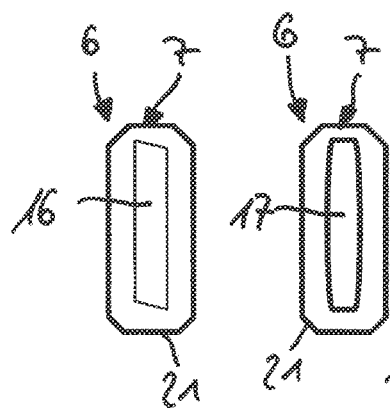
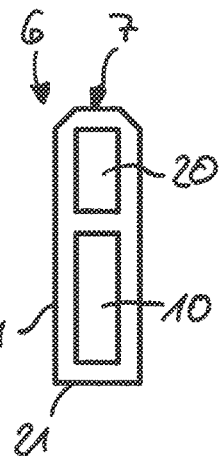
Fig. 3
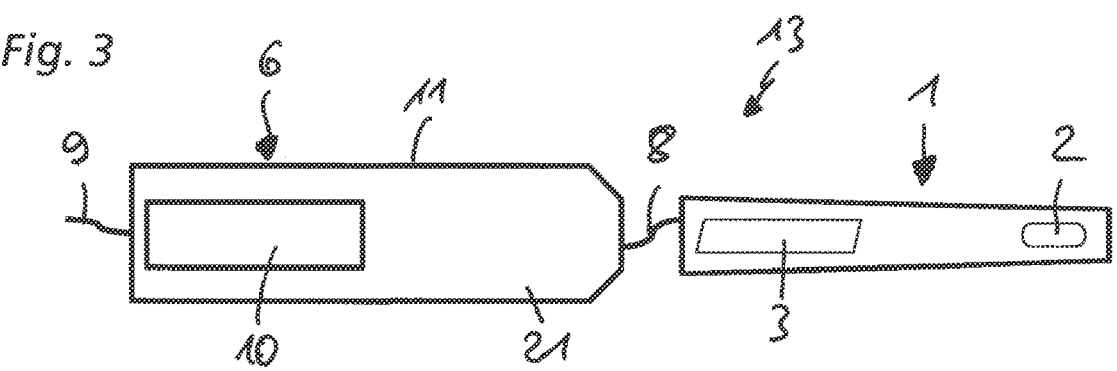
Fig. 4
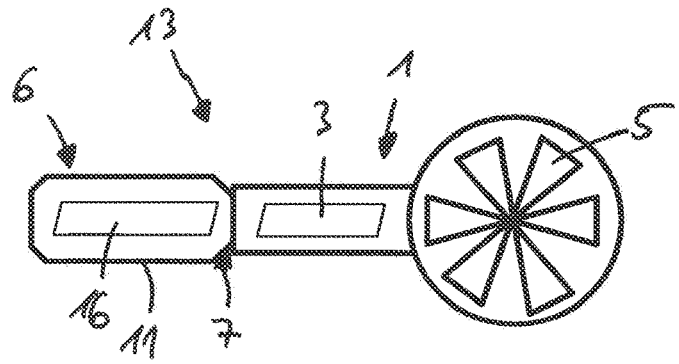
Fig. 5
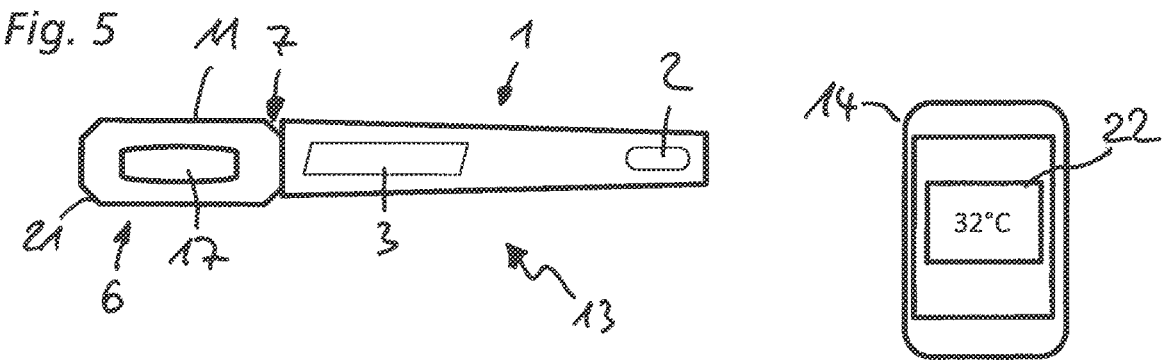

Fig. 6A
Fig. 6B
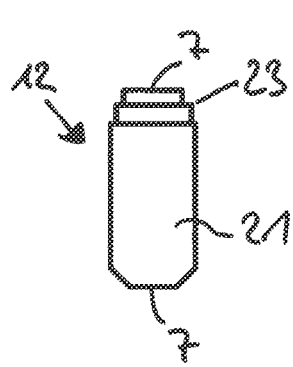
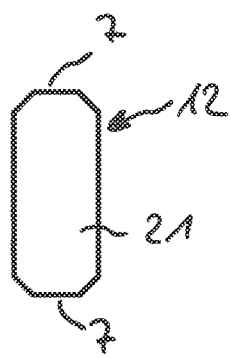
Fig. 7
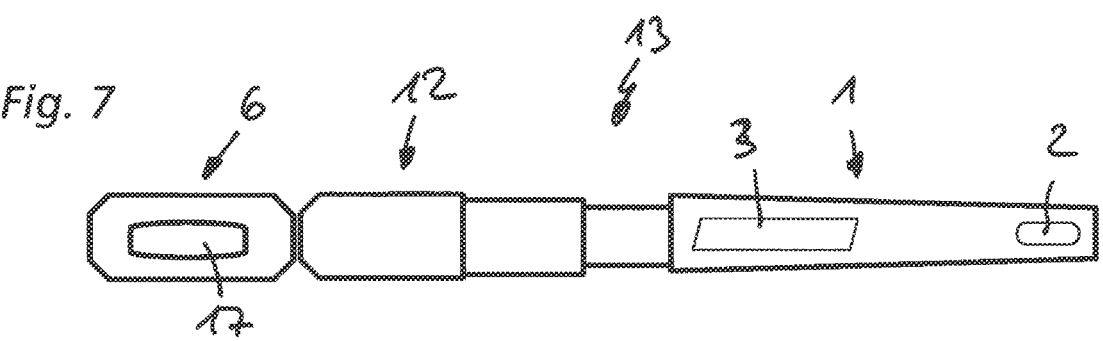
Fig. 8
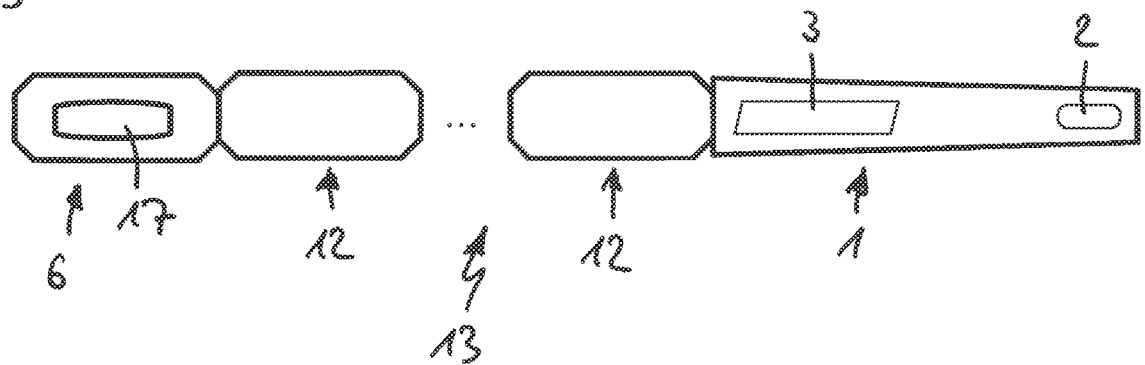

ASSEMBLY KIT FOR CONSTRUCTION OF A MEASUREMENT DEVICE

BACKGROUND

The invention is concerned with measuring apparatuses, in particular mobile handheld devices, for measuring a measured variable.

Such measuring apparatuses usually have a sensor for capturing a physical or chemical measured variable and an interface for transmitting the measured value to an evaluation unit. This evaluation unit can be integrated in the measuring apparatus. It is also possible for a display unit for presenting the measured value to be incorporated. Such a measuring apparatus can be in the form of a compact handheld device, which means that it is usable flexibly at different measuring locations.

A disadvantage of such a handheld device is that in the event of a fault in a functional unit, for example the sensor or the interface, the whole device fails and needs to be sent to the manufacturer, for example, for repair. Similarly, calibration of the sensor requires the whole device to be given up. During this time, measurement is possible only using a replacement device.

SUMMARY

It is an object of the invention to provide a measuring apparatus that is usable more flexibly and has fewer downtimes.

This object is achieved by an assembly kit for constructing a measuring apparatus having one or more features of the invention.

The assembly kit according to the invention for constructing a measuring apparatus comprises at least two sensor units, which are each fashioned for measuring different physical or chemical variables, and at least two communication units, which each have different interfaces for data transmission, wherein each of the sensor units is detachably connectable to each of the communication units of the assembly kit by a mechanical coupling.

The concept of the invention is separation of the different functional units of a measuring apparatus into separate, modularly assembleable units. A measuring apparatus can thus be assembled from different modules of the assembly kit. The assembly kit has at least two sensor units available in it that are each designed for capturing a different physical or chemical measured variable. Such measured variables can be temperature, flow rate or a gas concentration, for example.

Furthermore, the assembly kit has at least two communication units available in it that each have different interfaces by which the measurement results can be transmitted. Possible interfaces in this case are for example wireless interfaces such as WLAN, Bluetooth, Zigbee, NFC or the like. The interface can also be wired, however, and for example designed for connection to a field bus, for example Ethernet, Modbus, Profibus or the like.

The advantage of the invention is now that the sensor units and the communication units of the assembly kit are arbitrarily combinable with one another, so that a respective measuring apparatus matched to the required environment is able to be put together. The individual modules are in this case connected by a mechanical coupling.

The further advantage is that, in a use scenario for measuring different measured variables, for example only one communication unit is needed, which can be fitted with different sensor units for measuring different measured variables.

The modular design also has the further advantage that a fault in a sensor unit results in only this sensor unit needing to be replaced. Similarly, calibration of the sensor unit requires only this sensor unit to be given up. In each case, a different sensor unit can be used to continue measuring.

The modular design of the measuring apparatus also has the advantage that the number of parts, the development complexity and the test complexity are reduced.

In one development of the invention, the assembly kit has at least one sensor unit, which is fashioned for measuring at least two different physical variables, and/or at least one communication unit, which has at least two different interfaces for data transmission.

In an advantageous embodiment of the invention, the interfaces of the communication units are fashioned for making a wireless and/or wired connection. In particular, preferably, a or the wireless interface(s) is/are set up to make one or more respective wireless connection(s) selected from the group comprising WLAN, Bluetooth and/or Zigbee, and/or wherein a or the wired interface(s) is/are fashioned as a connection for a data transmission cable or as a data transmission cable.

It is expedient in the invention if sensor electronics are arranged in a housing of the sensor unit and/or in a housing of the communication unit and/or that communication electronics are arranged in a housing of the sensor unit and/or in a housing of the communication unit. It is in particular expedient if sensor electronics are arranged in the sensor unit and communication electronics are arranged in the communication unit. This allows a particularly inexpensive form of the modules according to the invention.

The mechanical coupling between a sensor unit and a communication unit is preferably designed such that it makes a secure and firm mechanical connection and is makeable and breakable again quickly and easily. In this manner, easy and convenient interchange of the modules is possible. It is particularly expedient in this case if the mechanical coupling is fashioned as a plug-in coupling, screw coupling, latching connection, clamping connection and/or friction joint.

In principle, it is advantageous if each measuring apparatus assembleable by the assembly kit has a handle. The handle permits easy and secure handling of the measuring apparatus. The handle can in this case be in the form of a separate module that is likewise connectable to a sensor unit or a communication unit by a mechanical coupling. It is in particular advantageous if the handle is fashioned by and/or arranged on a or the housing of the sensor unit and/or a or the housing of the communication unit. In this manner, a separate handle unit is not necessary. The handle can be formed by a rubber coating, for example.

The measured values captured by the sensor unit are transmitted to a processing or display unit via the communication unit. In this case, it can be advantageous for at least one communication unit and/or at least one sensor unit of the assembly kit to have a display unit for displaying a measured value. In this manner, the measured value can immediately be seen on the measuring apparatus and monitored.

Independently of that, it is also advantageous if at least one communication unit and/or at least one sensor unit of the assembly kit has a processing unit for measured value conditioning. The measured value conditioning can in this case include calculation of dependent values, storing and/or linking to other measured values, for example.

The mechanical coupling between a sensor unit and a communication unit also needs an electrical connection for transmitting the measured values from the sensor unit to the communication unit. In this case, it is particularly advantageous if the sensor units and the communication units are detachably connectable to one another by a plug-in coupling. The plug-in coupling can in this case provide both the electrical and the mechanical connection, which means that the coupling is particularly easy to handle.

In this case, either the sensor units can have a plug and the communication units can have a socket corresponding to the plug or the communication units can have a plug and the sensor units can have a socket corresponding to the plug.

In this case, it is furthermore important for a standard data protocol to be used for the electrical communication between the sensor units and the communication units. Strict observance of this protocol ensures any possible combination. This data protocol can result in not only the measured value but also a measured variable being transmitted, for example. This allows measured value evaluation without prior knowledge of the currently used sensor.

A measuring apparatus assembled from the assembly kit can be usable immediately. To this end, the individual modules, in particular the sensor unit and/or the communication unit, can have configuration data that are interchanged during assembly. In this manner, for example a communication unit can detect which sensor unit it is currently connected to.

In one development of the invention, the assembly kit can comprise a computer program product, in particular an app, installable on a data processing device, by which computer program product a data transmission to the data processing device and/or a configuration of a measuring apparatus, in particular the sensor unit and/or the communication unit, assembled from the assembly kit is performable. In this manner, a measuring apparatus can be set up and started up in a convenient manner. As well as that, transmission of the measured values to this computer program product is also possible. Therefore, the computer program product provides a way of processing, storing and/or linking measured values. Also, the existing sensor units can be managed thereby, so that any necessary calibrations can be terminated and displayed.

In a sensor unit according to the invention, a sensor is arranged in a housing, wherein the housing has a mechanical coupling for coupling a further unit for forming a measuring apparatus according to the invention. The further unit is in particular part of an assembly kit according to the invention. The measuring apparatus formed can be part of a series according to the invention.

A communication unit according to the invention has at least one communication interface for data interchange with an external device, and a housing, wherein the housing has a mechanical coupling for coupling a further unit for forming a measuring apparatus according to the invention. The further unit is in particular part of an assembly kit according to the invention. The measuring apparatus formed can be part of a series according to the invention.

One development of the invention provides for the assembly kit to have at least one extension unit having two mechanical couplings, wherein the extension unit is couplable between a sensor unit and/or a communication unit and/or one or two further extension units and/or wherein at least one two-pole connecting line between the couplings is connected to rotationally symmetrical electrical connecting means, in particular a jack plug and/or a jack socket.

The extension unit is preferably coupled between a sensor unit and a communication unit, for example in order to increase the total length of the measuring apparatus and/or the range of the sensor. To this end, the extension unit has mechanical couplings that match the couplings of the sensor unit and the communication unit. The couplings can for example each have a bayonet closure by which the individual parts are mechanically firmly and detachably connectable to one another.

In this case, the extension unit can have in each case a socket and a plug that match the plug of the sensor units and the socket of the communication units or the plug of the communication units and the socket of the sensor units.

Besides the mechanical coupling, the extension unit also has an electrical coupling, so that there is an electrical connection between the sensor unit and the communication unit even with the extension unit coupled in between. Inside the extension unit, signals are routed via a cable.

The electrical interface can be for example in the form of jack plugs that allow rotatability and that make the electrical connection between the sensor unit and the communication unit. The electrical interface can at the same time form the mechanical coupling.

Preferably, the jack plugs are arranged centrally in order to allow rotation for operating a bayonet closure.

In a first variant, the development provides for a telescopic system transferable between a retracted and an extended position. In this case, longitudinal adjustment can be effected steplessly or for example in discrete latching steps. In order to prevent an unwanted change of length, the extension unit can have a fixing apparatus by which for example the extended position is lockable. The fixing apparatus can be activable for example by rotation about the longitudinal axis.

In this embodiment, it can be expedient if, inside, the cable is in the form of a helical line that runs in a spiral and allows stowage of the excess line section in the retracted state inside.

In a second alternative, there is provision for the extension unit to be almost arbitrarily combinable with itself. To this end, there is provision for both sides to have mechanical couplings that are designed to correspond to one another in mirror-image fashion. In this manner, multiple extension units can be coupled to one another so as to achieve a desired or required length.

The invention furthermore comprises the use of an assembly kit according to the invention for producing a measuring apparatus, comprising the steps of:
  selection of a sensor unit from multiple different sensor units,
  selection of a communication unit from multiple different communication units, and
  putting together the selected sensor unit and the selected communication unit to form a measuring apparatus.

Multiple measuring apparatuses according to the invention can form a series, wherein each measuring apparatus has at least one sensor unit and at least one communication unit, and wherein the individual measuring apparatuses of the series are produced or assembled using the assembly kit according to the invention, in particular according to the use according to the invention in particular wherein at least two measuring apparatuses have concordant sensor units and different communication units.

The invention is explained in more detail below on the basis of exemplary embodiments with reference to the accompanying drawings, in which:

FIGS. 1A-1G show a schematic depiction of different sensor units of an assembly kit according to the invention, FIGS. 2A-2E show a schematic depiction of different communication units of an assembly kit according to the invention, FIG. 3 shows a measuring apparatus according to the invention with a sensor unit and a communication unit, connected by a cable, having a display unit, FIG. 4 shows a measuring apparatus according to the invention with in each case a communication unit and a sensor unit, FIG. 5 shows a measuring apparatus according to the invention with a sensor unit and a communication unit and a smartphone, FIGS. 6A and 6B show a schematic depiction of different extension units of an assembly kit according to the invention, FIG. 7 shows a measuring apparatus with a telescopic extension unit, and FIG. 8 shows a measuring apparatus with multiple extension units.

DETAILED DESCRIPTION

FIG. 1 shows multiple sensor units 1 of the assembly kit according to the invention in exemplary fashion. The sensor units 1 in the example have in each case a sensor 2 and matching sensor electronics 3. In this case, the sensor units 1 are set up to capture different physical and/or chemical measured variables.

FIG. 1A shows, by way of example, a sensor unit 1, for example for temperature measurement, having an angled shaft 4. FIG. 1C shows a sensor unit 1 having a straight shaft 4. FIG. 1C shows, by way of example, a sensor unit 1 having a flow sensor with an impeller wheel 5. The sensor units (a) to (c) have an integrated mechanical coupling 7 by which the sensor unit 1 is connectable to a communication unit 6 (see FIG. 2). FIG. 1D shows a sensor unit 1 similar to FIG. 1B. FIG. 1E shows a two-part sensor unit in which the sensor and the sensor electronics are each arranged in a separate housing connected by a connecting cable. FIG. 1F shows a further sensor unit 1, which has two sensors 2 for capturing different physical and/or chemical variables, however. Finally, FIG. 1G shows a sensor unit 1 for detecting moisture, for example in masonry. The sensor units (d) to (g) each have a cable 8 by which the sensor unit 1 is mechanically and electrically couplable to a communication unit 6.

The selection of sensor units shown is used in this case just to clarify that the assembly kit can have many different sensor units. The invention is thus by no means restricted to the selection shown, the number shown or the sensor types shown.

FIGS. 2A-2E show multiple communication units 6 of the assembly kit according to the invention by way of example. The communication units 6 each have communication electronics 15 that can be designed differently depending on the interface. Furthermore, each communication unit 6 has a coupling 7 for coupling a sensor unit 1. This coupling 7 is designed both for directly coupling a sensor unit 1 and for coupling a cable 8 of a sensor unit 1. For this purpose, the communication units 6 each have a socket with plug contacts (not shown) into which a matching plug with plug contacts (not shown) is insertable, which is arranged either firmly on the sensor unit 1 or on a cable 8 of the sensor unit 1. However, it is also conversely possible for a plug fitting into a socket of the sensor unit 1 or of the cable 8 to be arranged on each of the communication units 6.

The communication unit 6 of FIG. 2A is for example designed for wireless communication with a Bluetooth module. The communication unit 6 of FIG. 2B can communicate wirelessly by a Zigbee module 17 on the other hand.

The communication unit 6 of FIG. 2C has by contrast a bus module 19 for wired communication with a bus by a cable 9. Additionally, the communication unit 6 has a display unit 10 for presenting measured values.

The communication unit 6 of FIG. 2D has by contrast two independent communication interfaces, a WLAN module 18 and a Bluetooth module 16 for wireless communication.

The communication unit of FIG. 2D does not have an interface for communication with the outside. It has a display unit 10 for displaying measured values and a processing unit 20 for processing measured values. Such processing can involve for example forming a mean value from multiple measured values or linking two different measured variables from two sensors of a sensor unit as in FIG. 1F or other mathematical or statistical calculations. The processed value can then be displayed on the display unit 10.

In this case too, the selection of communication units shown is used only to clarify the assembly kit principle. The invention is thus restricted neither to the number shown nor to the interfaces described. It goes without saying that a communication unit can have any known interface or else any combination of known interfaces.

The assembly kit according to the invention is now formed from at least two different sensor units 1 and at least two different communication units 6. A measuring apparatus can now be produced by assembling a sensor unit 1 and a communication unit 6.

To allow better and easier handling of the measuring apparatus, a sensor unit 1 and/or a communication unit 6 can have a handle 11. The handle 11 can for example be formed by a housing 21 of a sensor unit 1 and/or of a communication unit 6. To this end, the housing 21 can have for example a rubber coating or other grip parts connected to the housing 21.

FIGS. 3 to 5 now show, in exemplary fashion, different measuring apparatuses assembleable using the assembly kit. The measuring apparatus 13 in FIG. 3 has for example a sensor unit 1 as per FIG. 1B and a communication unit 6 as per FIG. 2C.

In the case of the measuring apparatus 13 in FIG. 4, a sensor unit 1 as per FIG. 1C is assembled with a communication unit 6 as per FIG. 2A.

The measuring apparatus 13 in FIG. 5 consists of a sensor unit 1 as per FIG. 1D and a communication unit 6 as per FIG. 2B. Additionally, FIG. 6 shows a smartphone 14 or a tablet on which a computer program connected to the communication unit 6 is loaded. The computer program 22 is for example set up to configure the measuring apparatus 13 and/or to display measured values and/or to process measured values in another way. In the example, the computer program 22 shows a temperature of the sensor 2 of the sensor unit 1.

In certain measurement situations, it can be necessary to extend the measuring apparatus. To this end, the assembly kit according to the invention can include one or more extension units 12. FIGS. 6A and 6B show a schematic depiction of different extension units 12 of an assembly kit according to the invention. The extension unit 12 of FIG. 6A has a telescopic arrangement 23 permitting a stepless change of length. To connect to other kit elements, the extension unit 12 has mechanical couplings 7 on both sides that allow coupling to sensor and communication units.

The telescopic arrangement 23 can also have means for fixing the telescopic position, so that the length is not adjusted during operation. This fixing can be provided for example by internal clamping operable by rotating the frontmost telescopic segment.

The extension unit 12 of FIG. 6B has by contrast a fixed length. The mechanical couplings 7 at its ends are designed such that they are suitable not just for coupling to sensor and communication units, but also for coupling to further identical or other extension units 12. It is thus possible for two or more of these extension units 12 to be connected to one another in order to achieve a desired or required length. For this purpose, the kit can also have multiple extension units 12 having different fixed lengths.

FIG. 7 shows a measuring apparatus 13 with a sensor unit 1 as per FIG. 1D and a communication unit 6 as per FIG. 2B, between which a telescopic extension unit 12 as per FIG. 6A is coupled.

FIG. 8 shows the measuring apparatus 13 with a sensor unit 1 as per FIG. 1D and a communication unit 6 as per FIG. 2B, between which multiple telescopic extension units 12 as per FIG. 6B are coupled.

Besides the embodiments shown here, any other desired combination of the individual assembly kit units is naturally possible.

LIST OF REFERENCE SIGNS

1 Sensor unit
2 Sensor
3 Sensor electronics
4 Shaft
5 Impeller wheel
6 Communication unit
7 Coupling
8 Cable between sensor unit and communication unit
9 Cable on interface
10 Display unit
11 Handle
12 Extension unit
13 Measuring apparatus
14 Smartphone
15 Communication electronics
16 Bluetooth module
17 Zigbee module
18 WLAN module
19 Bus module
20 Processing unit
21 Housing
22 Computer program product
23 Telescopic arrangement

The invention claimed is:

1. An assembly kit for constructing a measuring apparatus (13), comprising:
at least two sensor units (1), each configured for measuring a different variable;
at least two communication units (6), each including a different interface for data transmission;
a mechanical coupling (7) by which each of the sensor units (1) is detachably connectable to each of the communication units (6) of the assembly kit; and
at least one extension unit (12) including an extension housing (21) having mechanical couplings (7) on both sides, to which mechanical couplings at least one of the sensor unit (1), the communication unit (6), or a further extension unit (12) are selectively couplable, wherein the extension housing (21) has a telescopic arrangement (23) by which a longitudinal extent of the extension unit (12) is alterable.

2. The assembly kit as claimed in claim 1, wherein the assembly kit comprises at least one of the sensor units (1) fashioned for measuring at least two different variables.

3. The assembly kit as claimed in claim 1, wherein the interfaces of the communication units (6) are configured for making at least one of a wireless or wired connection.

4. The assembly kit as claimed in claim 1, wherein sensor electronics (3) are arranged in at least one of a housing (21) of the sensor unit (1) or a housing (21) of the communication unit (6).

5. The assembly kit as claimed in claim 1, wherein the mechanical coupling (7) comprises at least one of a plug-in coupling, a screw coupling, a latching connection, a clamping connection, or friction joint.

6. The assembly kit as claimed in claim 1, wherein each said measuring apparatus (13) assembleable by the assembly kit has a handle (11) arranged on at least one of a housing (21) of one of the sensor units (1) or a housing (21) of one of the communication units (6).

7. The assembly kit as claimed in claim 1, further comprising a display unit (10) provided on at least one of the communication units (6) or at least one of the sensor units (1), the display unit (10) is adapted to display a measured value.

8. The assembly kit as claimed in claim 1, wherein the sensor units (1) and the communication units (6) are detachably connectable to one another by a plug-in coupling (7), and the sensor units (1) each have a plug and the communication units (6) each have a socket corresponding to the plug, or the communication units (6) each have a plug and the sensor units (1) each have a socket corresponding to the plug.

9. The assembly kit as claimed in claim 1, further comprising a computer program product (22) fixed in a non-transitory tangible medium and installable on a data processing device (14) that provides at least one of a data transmission to the data processing device or a configuration of a measuring apparatus (13) to the data processing device assembled from the assembly kit.

10. A method of producing a measuring apparatus from an assembly kit as claimed in claim 1, the method comprising the steps of:
selecting one of the sensor units (1) from the at least two different sensor units (1),
selecting one of the communication units (6) from the at least two different communication units (6), and
putting together the selected sensor unit (1) and the selected communication unit (6) to form the measuring apparatus (13).

11. A series having multiple different measuring apparatuses, wherein each measuring apparatus has at least one sensor unit and at least one communication unit, and wherein individual ones of said measuring apparatuses of the series are produced using the assembly kit as claimed in claim 1.

12. An assembly comprising a sensor unit (1) including a sensor (2) arranged in a housing (21), the housing (21) has a mechanical coupling (7) for coupling a further unit, a communication unit having at least one communication interface for data interchange with an external device and having a further housing (21), wherein the further housing (21) has a mechanical coupling (7) for coupling a further unit, and the sensor unit and the communication unit are connectable in order to form a measuring apparatus (13), and at least one extension unit (12) including an extension housing (21) having mechanical couplings (7) on first and second sides, the sensor unit is coupled to the mechanical coupling on the first side and the communication unit (6) is coupled to the mechanical coupling on the second side, wherein the extension housing (21) has a telescopic arrangement (23) by which a longitudinal extent of the extension unit (12) is alterable.

13. An extension unit (12) comprising an extension housing (21) having mechanical couplings (7) on both sides, to which mechanical couplings at least one of a sensor unit (1), a communication unit (6), or a further extension unit (12) are selectively couplable, wherein the extension housing (21) has a telescopic arrangement (23) by which a longitudinal extent of the extension unit (12) is alterable.

14. The assembly kit as claimed in claim 1, wherein the assembly kit comprises at least one of the communication units (6) having at least two different ones of the interfaces for data transmission.

15. The assembly kit as claimed in claim 1, wherein the wireless interface(s) is/are set up to make one or more respective wireless connection(s) selected from the group comprising WLAN (18), Bluetooth (16) and/or Zigbee (17), and/or wherein a or the wired interface(s) (19) is/are fashioned as a connection for a data transmission cable (9) or as a data transmission cable (9).

16. The assembly kit as claimed in claim 1, further comprising communication electronics (15) arranged in at least one of a housing (21) of the sensor unit (1) or a housing (21) of the communication unit (6).

17. The assembly kit as claimed in claim 1, further comprising a processing unit (20) in at least one of the communication units (6) or at least one of the sensor units (1), the processing unit (20) is configured for measured value conditioning.

18. The extension unit as claimed in claim 13, further comprising at least one two-pole connecting line between the couplings (7) is connected to rotationally symmetrical electrical connections.

\* \* \* \* \*